United States Patent
Liu et al.

(10) Patent No.: US 11,032,122 B2
(45) Date of Patent: Jun. 8, 2021

(54) MULTICAST DELAY DIAGNOSIS METHOD AND APPARATUS

(71) Applicant: Huawei Technologies Co., Ltd., Shenzhen (CN)

(72) Inventors: De Liu, Shenzhen (CN); Pengju Tan, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 16/096,028

(22) PCT Filed: Apr. 25, 2016

(86) PCT No.: PCT/CN2016/080149
§ 371 (c)(1),
(2) Date: Oct. 24, 2018

(87) PCT Pub. No.: WO2017/185212
PCT Pub. Date: Nov. 2, 2017

(65) Prior Publication Data
US 2019/0140884 A1     May 9, 2019

(51) Int. Cl.
*H04L 29/06* (2006.01)
*H04N 21/6405* (2011.01)
(Continued)

(52) U.S. Cl.
CPC ............ *H04L 29/06* (2013.01); *H04L 12/185* (2013.01); *H04L 12/1877* (2013.01);
(Continued)

(58) Field of Classification Search
CPC .................................................. H04L 29/06
See application file for complete search history.

(56) References Cited

U.S. PATENT DOCUMENTS

| 6,515,967 B1 | 2/2003 | Wei et al. |
| 6,590,869 B1 * | 7/2003 | Beyda ................ H04M 7/0057 370/248 |

(Continued)

FOREIGN PATENT DOCUMENTS

| CN | 101022374 A | 8/2007 |
| CN | 102137275 A | 7/2011 |

(Continued)

OTHER PUBLICATIONS

Deering, S., "Host Extensions for IP Multicasting," Network Working Group, RFC1112, Aug. 1989, pp. 1-17.
(Continued)

*Primary Examiner* — Alpus Hsu
*Assistant Examiner* — Camquyen Thai
(74) *Attorney, Agent, or Firm* — Slater Matsil, LLP

(57) ABSTRACT

A multicast delay diagnosis method is provided, where the method includes sending, by a terminal device, a first domain name resolution request to a network node; receiving a first multicast test address returned by the network node; sending a first multicast test join request to the network node by using the first multicast test address, and recording a time point for sending the first multicast test join request; receiving a first packet returned by the network node, and recording a time point for receiving the first packet; calculating, according to the time point for sending the first multicast test join request and the time point for receiving the first packet, a first delay caused when the terminal device joins a multicast test group of the network node; and determining multicast network quality according to the first delay.

20 Claims, 8 Drawing Sheets

(51) Int. Cl.
*H04N 21/643* (2011.01)
*H04N 21/438* (2011.01)
*H04L 12/26* (2006.01)
*H04L 12/18* (2006.01)
*H04L 29/12* (2006.01)

(52) U.S. Cl.
CPC .......... *H04L 43/0852* (2013.01); *H04L 43/50* (2013.01); *H04L 61/1511* (2013.01); *H04L 61/2069* (2013.01); *H04L 65/4076* (2013.01); *H04L 65/80* (2013.01); *H04N 21/4384* (2013.01); *H04N 21/6405* (2013.01); *H04N 21/64322* (2013.01)

(56) References Cited

U.S. PATENT DOCUMENTS

| | | | |
|---|---|---|---|
| 8,463,306 B1 | 6/2013 | Shah et al. | |
| 2008/0256232 A1* | 10/2008 | Fleury | H04L 69/329 709/224 |
| 2008/0301744 A1* | 12/2008 | Hutchings | H04N 21/6405 725/110 |
| 2009/0049485 A1* | 2/2009 | Agrawal | H04N 21/4384 725/87 |
| 2009/0118017 A1* | 5/2009 | Perlman | A63F 13/52 463/42 |
| 2010/0229211 A1* | 9/2010 | Lee | H04N 21/26275 725/109 |
| 2012/0102188 A1* | 4/2012 | Shah | H04L 12/185 709/224 |
| 2012/0155280 A1 | 6/2012 | Wu et al. | |
| 2012/0287289 A1 | 11/2012 | Steinberg et al. | |
| 2012/0311621 A1* | 12/2012 | Foster | H04N 21/4383 725/14 |
| 2013/0250129 A1* | 9/2013 | Patil | H04L 43/0835 348/192 |
| 2014/0086073 A1* | 3/2014 | Baykal | H04L 41/5067 370/252 |
| 2015/0063132 A1* | 3/2015 | Dunlap | H04L 43/0852 370/252 |
| 2015/0117195 A1* | 4/2015 | Toy | H04L 47/263 370/232 |
| 2018/0270161 A1* | 9/2018 | Popescu | H04L 43/10 |

FOREIGN PATENT DOCUMENTS

| | | |
|---|---|---|
| CN | 102572706 A | 7/2012 |
| CN | 104703198 A | 6/2015 |
| CN | 104734919 A | 6/2015 |
| CN | 104954320 A | 9/2015 |
| EP | 2466911 A1 | 6/2012 |

OTHER PUBLICATIONS

Fenner, W., "Internet Group Management Protocol, Version 2," Network Working Group, RFC2236, Nov. 1997, pp. 1-24.

* cited by examiner

MULTICAST DELAY DIAGNOSIS METHOD AND APPARATUS

CROSS-REFERENCE TO RELATED APPLICATIONS

This application is a national stage of International Application No. PCT/CN2016/080149, filed on Apr. 25, 2016, which is hereby incorporated by reference in their entireties.

TECHNICAL FIELD

The present invention relates to the field of network technologies, and in particular, to a multicast delay diagnosis method and apparatus.

BACKGROUND

Multicast transmission is a network technology in which a multicast source simultaneously transmits information to a group of destination addresses. The multicast source sends a packet to a specific multicast group, and only an address that belongs to the multicast group can receive the packet. Regardless of how many target addresses in a network, only one packet is transmitted in any link of the entire network. Therefore, by means of multicast, network bandwidth can be greatly saved, data transmission efficiency can be improved, and a backbone network is less likely to be congested. As a communications mode parallel to unicast and broadcast, multicast means more. More importantly, a multicast feature of a network may be used to conveniently provide some new value-added services, including online live telecasting, a web television, distance learning, telemedicine, a network radio station, a real-time video conference, and the like in the information service field of the Internet.

IGMP (Internet Group Management Protocol, Internet Group Management Protocol) is a multicast protocol. The protocol operates between a host and a multicast router. IGMP implements a bidirectional function. On one hand, a host notifies, by using the IGMP protocol, a local router of a wish to join a specific multicast group and to receive information about the specific multicast group. On the other hand, the router periodically queries, by using the IGMP protocol, whether a member of a known group is in an active state in a local area network (that is, whether a member that belongs to a specific multicast group still exists in the network segment), to collect and maintain a group membership in a connected network. Information recorded in the router by using IGMP is information about whether a group member of a multicast group exists in a local area rather than a correspondence between a multicast group and a host. In IPv4, IGMP includes three versions: IGMPv1, IGMPv2, and IGMPv3. A basic query and reporting process for a group member is defined in IGMPv1. On a basis of IGMPv1, a fast-leave mechanism for a group member is added to IGMPv2. A function that a member may receive or not receive packets from some specified multicast sources is added to IGMPv3. Currently, IGMPv3 is mainly used. In IPv6, the router discovers, by using MLD (Multicast Listener Discover, Multicast Listener Discovery), a multicast listener in a network segment directly connected to the router. An ICMPv6 (Internet Control Message Protocol for IPv6, Internet Control Message Protocol for IPv6) packet type is used in MLD, and MLD includes two versions: MLDv1 and MLDv2. Currently, MLDv2 is mainly used.

In a conventional IPTV (Internet Protocol Television, interactive personality TV) network, an STB (Set Top Box, set top box) in a home network is connected to an HG (Home Gateway, home gateway) in a wired or wireless manner. The HG is an ingress of the IPTV network. The IPTV network usually includes a multicast router and a multicast media server. The STB is connected to the IPTV network by using the HG, to implement a multicast service and an on-demand service, such as a video service and a voice service. As shown in FIG. 1, FIG. 1 is a schematic diagram in which a home network is connected to an HG in a wired manner. As shown in FIG. 2, FIG. 2 is a schematic diagram in which a home network is connected to an HG in a wireless manner. An STB initiates, in a local network, a request (Join Request) for joining a multicast group. After receiving the request, an HG determines whether a local multicast list includes the multicast group. If the local multicast list includes the multicast group, the HG immediately forwards the multicast stream to the STB. Otherwise, the HG initiates, to an upper-level multicast router in an IGMP proxy manner, the multicast request for joining the group. After receiving the multicast request for joining the group, the multicast router obtains multicast stream data from a media server, and sends the multicast stream data to the HG. The HG forwards the multicast stream data to the STB.

In the IPTV network, when a switchover from a program to another program is performed, the STB needs to leave an old IGMP/MLD multicast group and join a new IGMP/MLD multicast group. Therefore, an old multicast stream is stopped, and a new multicast stream is started. However, if the old multicast stream is stopped, but the new multicast stream is still not started, an image is in a frame freezing state at this time. In this case, user experience is extremely poor. In the prior art, a unicast stream is used to resolve a frame freezing phenomena caused by a normal delay. However, in an actual case, there is a plurality of networks. When a packet is forwarded between the plurality of networks, an abnormal delay may be caused by a device fault in a network or the like. It should be noted that the normal delay is a known delay in a network, that is, a delay cause is known. The abnormal delay is an unknown delay in a network, that is, a delay cause is unknown, and a location in which the delay is caused and the delay cause need to be determined. The abnormal delay may be caused in a home network, or may be caused in a public core network of an operator. To resolve a frame freezing problem, it needs to be determined whether the abnormal delay is caused in the home network or the public core network. Therefore, how to fast determine a location in which the abnormal delay is caused is an urgent problem to be resolved.

SUMMARY

Embodiments of the present invention provide a multicast delay diagnosis method and apparatus, to resolve a problem that a location in which a delay is caused cannot be fast determined when a problem occurs in a multicast service.

According to a first aspect, an embodiment of this application provides a multicast delay diagnosis method, including:

A terminal device first sends a first domain name resolution request to a network node. The network node receives the first domain name resolution request, and returns a first multicast test address to the terminal device. The terminal device receives the first multicast test address returned by the network node, sends a first multicast test join request to the network node by using the first multicast test address, and records a time point for sending the first multicast test join request. After receiving the first multicast test join request, the network node returns a first packet to the terminal device. The terminal device receives the first packet returned by the network node, and records a time point for receiving the first packet. Finally, the terminal device calculates, according to the time point for sending the first multicast test join request and the time point for receiving the first packet, a first delay caused when the terminal device joins a multicast test group of the network node, and determines multicast network quality according to the first delay. A network transmission delay is measured by sending a special DNS request and receiving a UDP packet. Therefore, it is fast determined whether a problem occurs in quality of a multicast network between the terminal device and the network node, so as to improve the multicast network quality.

In another possible design, the terminal device first sends a second domain name resolution request to the network node. After receiving the second domain name resolution request, the network node returns a second multicast test address to the terminal device. The terminal device receives the second multicast test address returned by the network node, sends a second multicast test join request to the network node by using the second multicast test address, and records a time point for sending the second multicast test join request. After receiving the second multicast test join request, the network node forwards the second multicast test join request to a multicast server. The multicast server receives the second multicast test join request, and sends a second packet to the network node. After receiving the second packet, the network node forwards the second packet to the terminal device. The terminal device receives the second packet forwarded by the network node, and records a time point for receiving the second packet. Finally, the terminal device calculates, according to the time point for sending the second multicast test join request and the time point for receiving the second packet, a second delay caused when the terminal device joins a multicast group of the multicast server, and determines the multicast network quality according to the first delay and the second delay. Therefore, it can be determined whether a problem occurs in the quality of the multicast network between the terminal device and the network node or a problem occurs in quality of a multicast network between the network node and the multicast server, so as to improve the multicast network quality.

In another possible design, it is determined whether the first delay is greater than preset duration; and prompt information is sent if the first delay is greater than the preset duration, to remind a user that quality of a multicast network between the terminal device and the network node needs to be improved.

In still another possible design, the first delay is subtracted from the second delay, to obtain a third delay caused between the network node and the multicast server; the first delay and the third delay are compared; and the multicast network quality is determined according to a result obtained after the comparison between the first delay and the third delay. In a normal case, the first delay between the terminal device and the network node is less than the third delay between the network node and the multicast server. If the first delay is not less than the third delay, it is determined that quality of a multicast network between the terminal device and the network node does not meet a multicast requirement, and further a user is reminded to improve the multicast network quality.

In still another possible design, after receiving the first multicast test address returned by the network node, the terminal device sends a multicast test leaving request to the network node by using the first multicast test address. Therefore, both the terminal device and the network node are set to be in an initial working state, to ensure that a packet received by the terminal device is obtained according to a multicast test join request that is sent this time rather than a multicast test join request that is sent last time. In addition, after receiving the first packet forwarded by the network node, the terminal device may send a multicast test leaving request to the network node by using the first multicast test address. Therefore, diagnosis test states of the multicast server and the terminal device are cleared, to ensure that a next diagnosis test can be normally performed.

In still another possible design, after receiving the second multicast test address returned by the network node, the terminal device sends a multicast test leaving request to the network node by using the second multicast test address, and the network node forwards the multicast test leaving request to the multicast server. Therefore, both the terminal device and the network node are set to be in an initial working state, to ensure that a packet received by the terminal device is obtained according to a multicast test join request that is sent this time rather than a multicast test join request that is sent last time. In addition, after receiving the second packet forwarded by the network node, the terminal device may send a multicast test leaving request to the network node by using the second multicast test address, and the network node forwards the multicast test leaving request to the multicast server. Therefore, diagnosis test states of the multicast server and the terminal device are cleared, to ensure that a next diagnosis test can be normally performed.

According to a second aspect, an embodiment of this application provides a multicast delay diagnosis apparatus. The apparatus is configured to implement the method and functions that are performed by the terminal device in the first aspect. The apparatus is implemented by using hardware/software. The hardware/software thereof includes units corresponding to the foregoing functions.

According to a third aspect, an embodiment of the present invention provides a multicast delay diagnosis apparatus, including a processor, a network interface, a memory, and a communications bus, where the communications bus is configured to implement connection and communication between the processor, the network interface, and the memory, and the processor executes a program stored in the memory, to implement the steps in the method of the terminal device according to the first aspect.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 4:
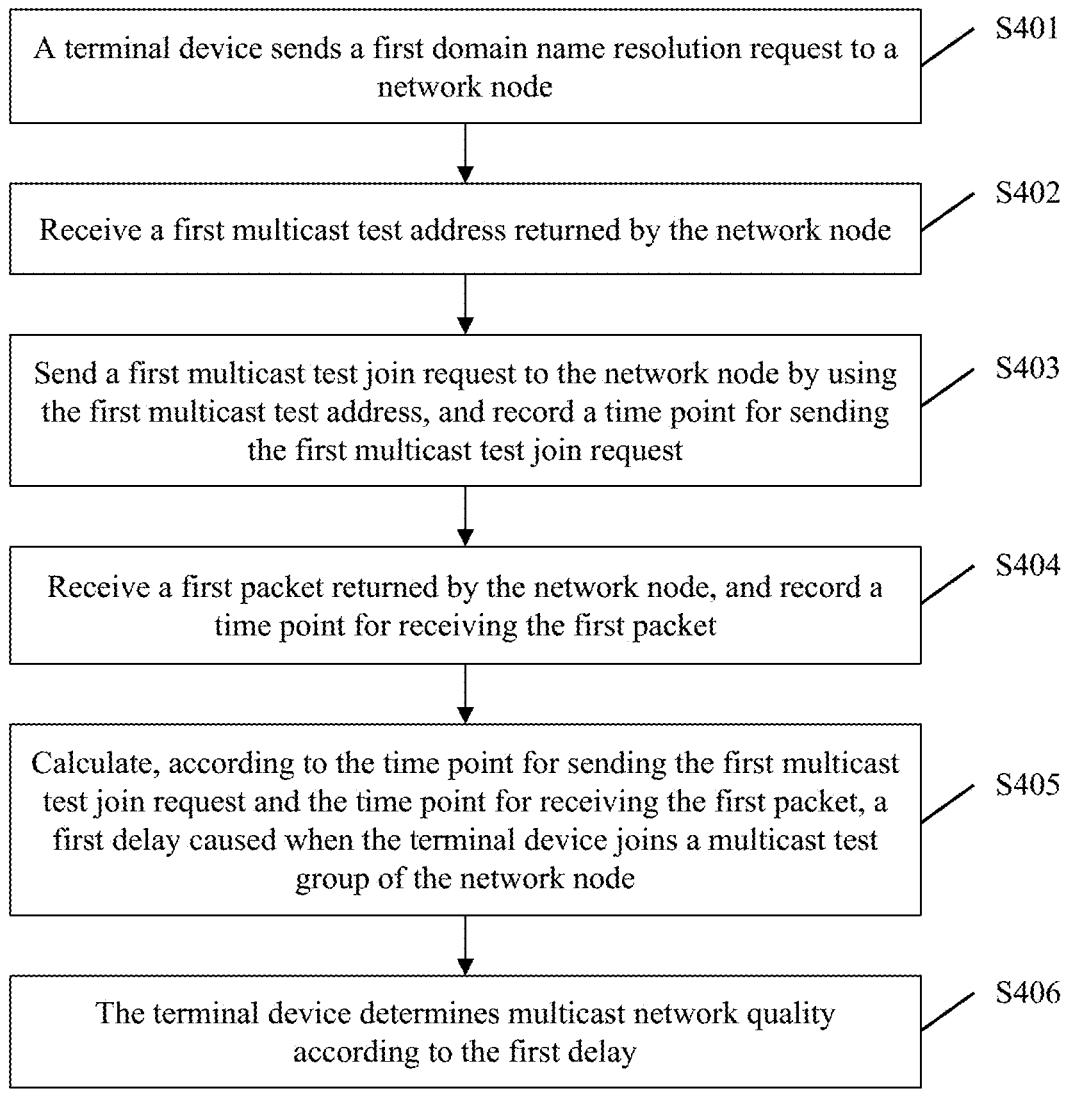
FIG. 4 is a schematic flowchart of a multicast delay diagnosis method according to an embodiment of the present invention.

Referring to FIG. 4, FIG. 4 is a schematic flowchart of a multicast delay diagnosis method according to an embodiment of the present invention. As shown in FIG. 4, the method in this embodiment of the present invention includes the following steps.

S401. A terminal device sends a first domain name resolution request to a network node, where the first domain name resolution request is used to request the network node to return a first multicast test address.

During specific implementation, the first domain name resolution request carries a special first resource locator address URL, for example, igmptest.ip. The first resource locator address URL is an address preconfigured for the terminal device and the network node. The first resource locator address URL is used to instruct the network node to return a multicast test address for joining a multicast group of the network node. After receiving the first domain name resolution request, the network node returns multicast test addresses: an IPv4 address and an IPv6 address. The IPv4 address and the IPv6 address are multicast test addresses preconfigured in the network node. For example, the IPv4 address is 224.0.0.111, and the IPv6 address is FF02::111.

S402. The terminal device receives the first multicast test address returned by the network node.

Optionally, after receiving the first multicast test address returned by the network node, the terminal device sends a multicast test leaving request to the network node by using the first multicast test address.

During specific implementation, if multicast test addresses received by the terminal device include the IPv4 address and the IPv6 address, it indicates that the network node has both an IPv4 diagnosis test capability and an IPv6 diagnosis test capability. The terminal device may choose, according to a status of supporting two protocols (IPv4 and IPv6) by the terminal device, to send a first multicast test leaving request to the network node according to the IPv4 address or the IPv6 address. If the terminal device supports IPv4, the terminal device may send the first multicast test leaving request to the network node according to the IPv4 address. If the terminal device supports IPv6, the terminal device may send the first multicast test leaving request to the network node according to the IPv6 address. If the terminal device supports both IPv4 and IPv6, the terminal device chooses to send the first multicast test leaving request to the network node according to the IPv4 address or the IPv6 address. Therefore, both the terminal device and the network node are set to be in an initial working state, to ensure that a packet received by the terminal device is obtained according to a multicast test join request that is sent this time rather than a multicast test join request that is sent last time.

S403. The terminal device sends a first multicast test join request to the network node by using the first multicast test address, and records a time point for sending the first multicast test join request.

Figure 5:
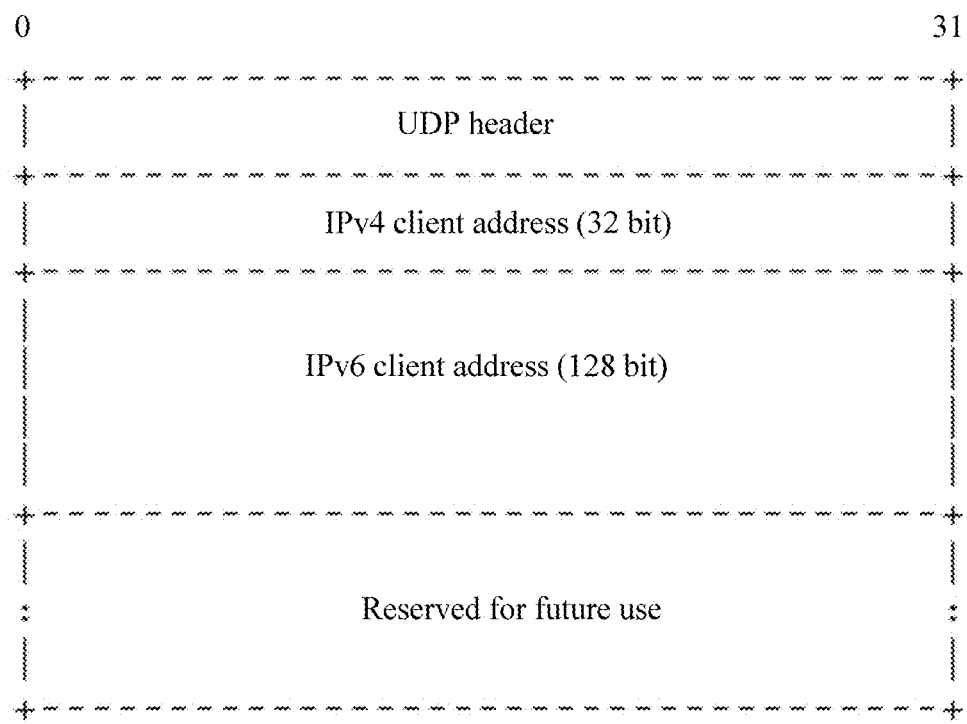
FIG. 5 is a schematic structural diagram of a format of a packet according to an embodiment of the present invention.

During specific implementation, the terminal device may choose, according to the status of supporting the two protocols (IPv4 and IPv6) by the terminal device, to send the first multicast test join request to the network node according to the IPv4 address or the IPv6 address. After receiving the first multicast test join request, the network node returns a UDP (User Datagram Protocol, user datagram protocol) packet. The packet carries an IPv4 address or an IPv4 address of the terminal device. As shown in FIG. 5, FIG. 5 shows a format of a packet according to an embodiment of the present invention. From top to bottom, the packet is sequentially used to fill a packet header, an IPv4 address, an IPv6 address, and a reserved bit. If the terminal device sends the first multicast test join request to the network node according to the IPv4 address, the network node returns a first packet that carries the IPv4 address of the terminal device. If the terminal device sends the first multicast test join request to the network node according to the IPv6 address, the network node returns a first packet that carries the IPv6 address of the terminal device.

S404. The terminal device receives a first packet returned by the network node, and records a time point for receiving the first packet.

Optionally, after receiving the packet returned by the network node, the terminal device may send a multicast test leaving request to the network node by using the first multicast test address. Therefore, diagnosis test states of the network node and the terminal device are cleared, to ensure that a next diagnosis test can be normally performed.

It should be noted that the terminal device may send, before S403, a multicast test leaving request to the network node by using the first multicast test address. In this way, an accurate multicast delay in a current network can be obtained. A multicast test leaving request may fail to be executed in a previous multicast test, and therefore in a current multicast test, a multicast test leaving request is sent before a multicast test join request is sent. In this way, diagnosis test states can be cleared before the current diagnosis test is performed, so that an accurate multicast delay is obtained.

S405. The terminal device calculates, according to the time point for sending the first multicast test join request and the time point for receiving the first packet, a first delay caused when the terminal device joins a multicast group of the network node.

Figure 1:
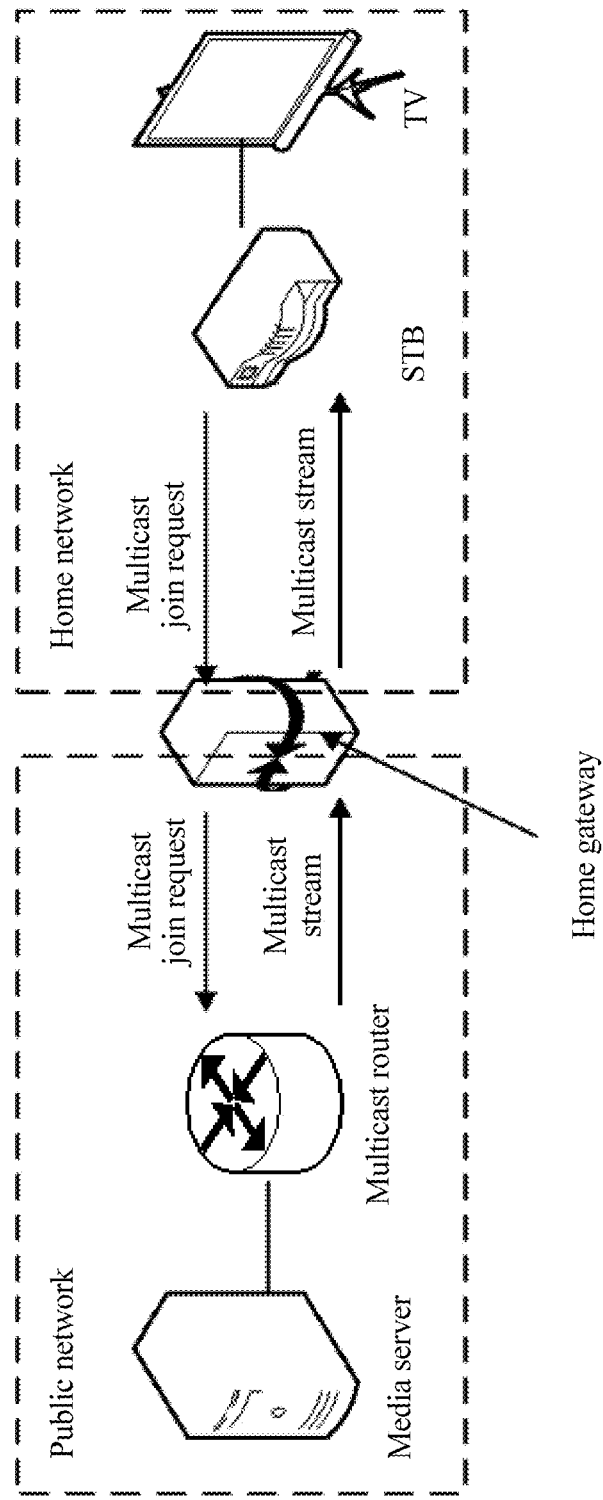
FIG. 1 is a schematic diagram in which a home network is connected to an HG according to an embodiment of the present invention.
Figure 2:
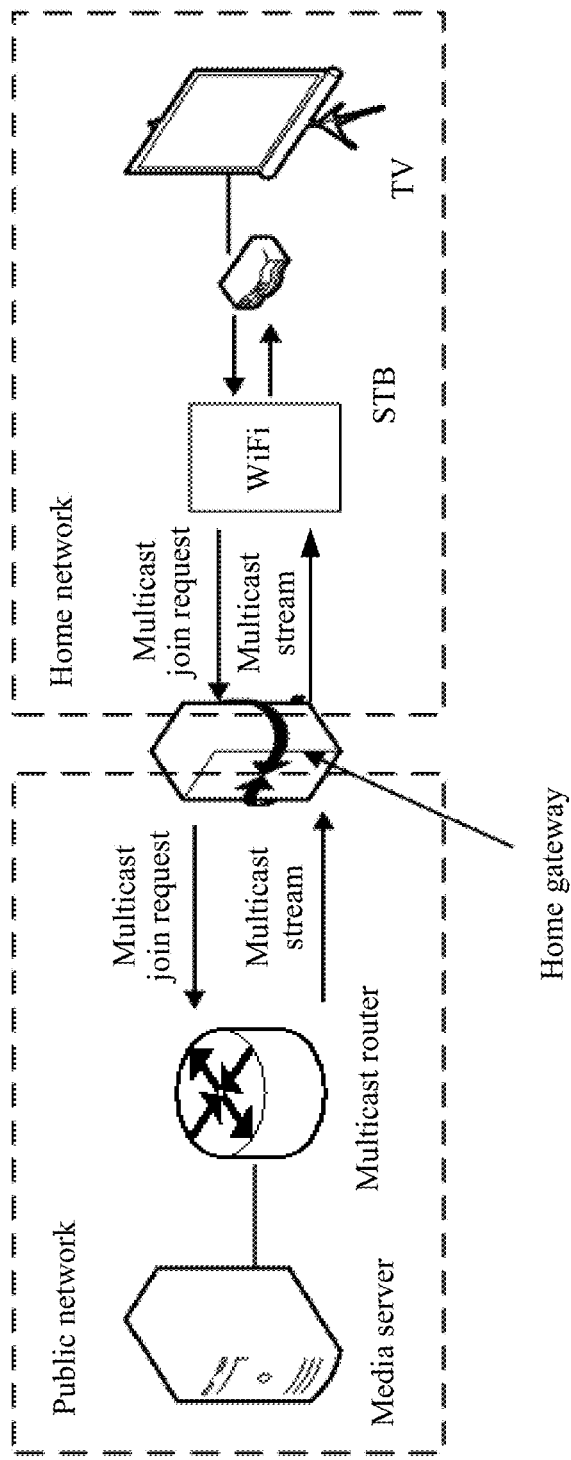
FIG. 2 is another schematic diagram in which a home network is connected to an HG according to an embodiment of the present invention.
Figure 3:
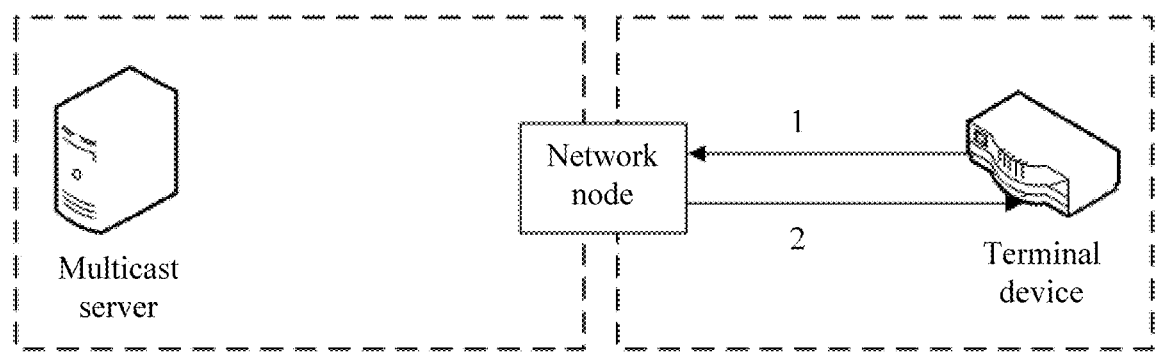
FIG. 3(A) is a schematic structural diagram of a multicast system according to an embodiment of the present invention.
FIG. 3(B) is a schematic structural diagram of another multicast system according to an embodiment of the present invention.
Figure 3:
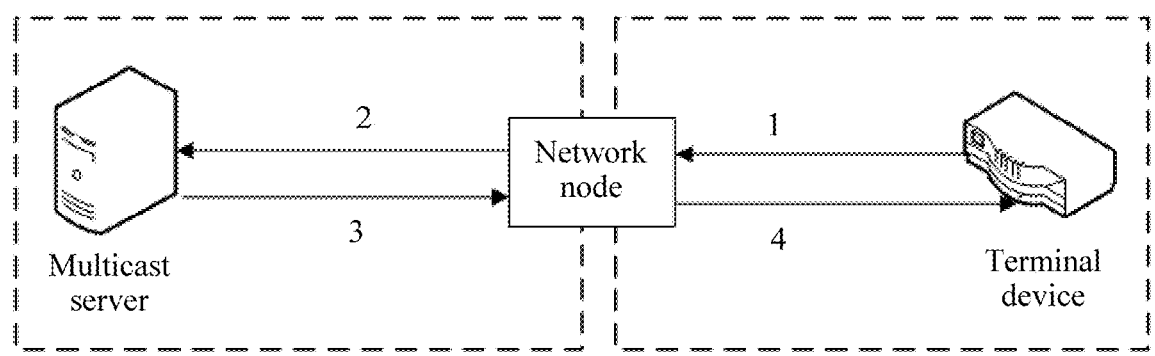

During specific implementation, as shown in FIG. 3(A), because there is a specific transmission distance between the terminal device and the network node, a delay is inevitably caused from sending the first multicast test join request to receiving the first packet. Therefore, the time point for sending the first multicast test join request is subtracted from the time point for receiving the first packet, so that the first delay caused when the terminal device joins the multicast group of the network node can be obtained.

S406. The terminal device determines multicast network quality according to the first delay.

During specific implementation, it may be determined whether the first delay is greater than preset duration, and prompt information is sent if the first delay is greater than the preset duration. The prompt information is used to remind a user to improve quality of a multicast network between the terminal device and the network node.

In this embodiment of the present invention, the terminal device sends a special DNS request to the network node, to obtain the multicast test address used to join the multicast group of the network node; records the time point for sending the first multicast test join request and the time point for receiving the first packet; obtains, by means of calculation, the first delay caused when the terminal device joins the multicast group of the network node; and determines whether a problem occurs in the quality of the multicast network between the terminal device and the network node. Therefore, a network in which a problem occurs is fast determined, so as to improve the multicast network quality.

Figure 6A:
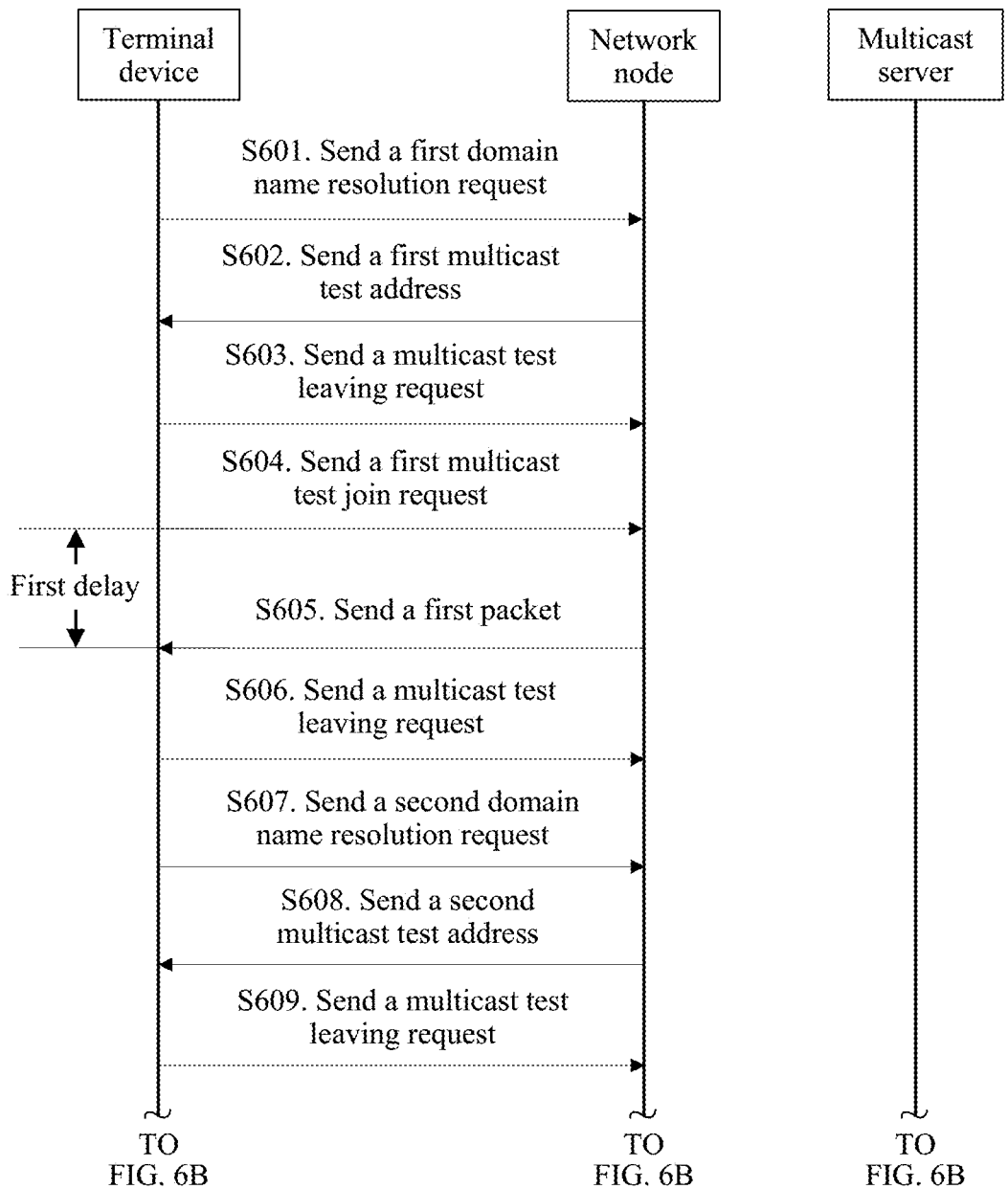
FIG. 6A and FIG. 6B are schematic flowcharts of another multicast delay diagnosis method according to an embodiment of the present invention.
Figure 6B:
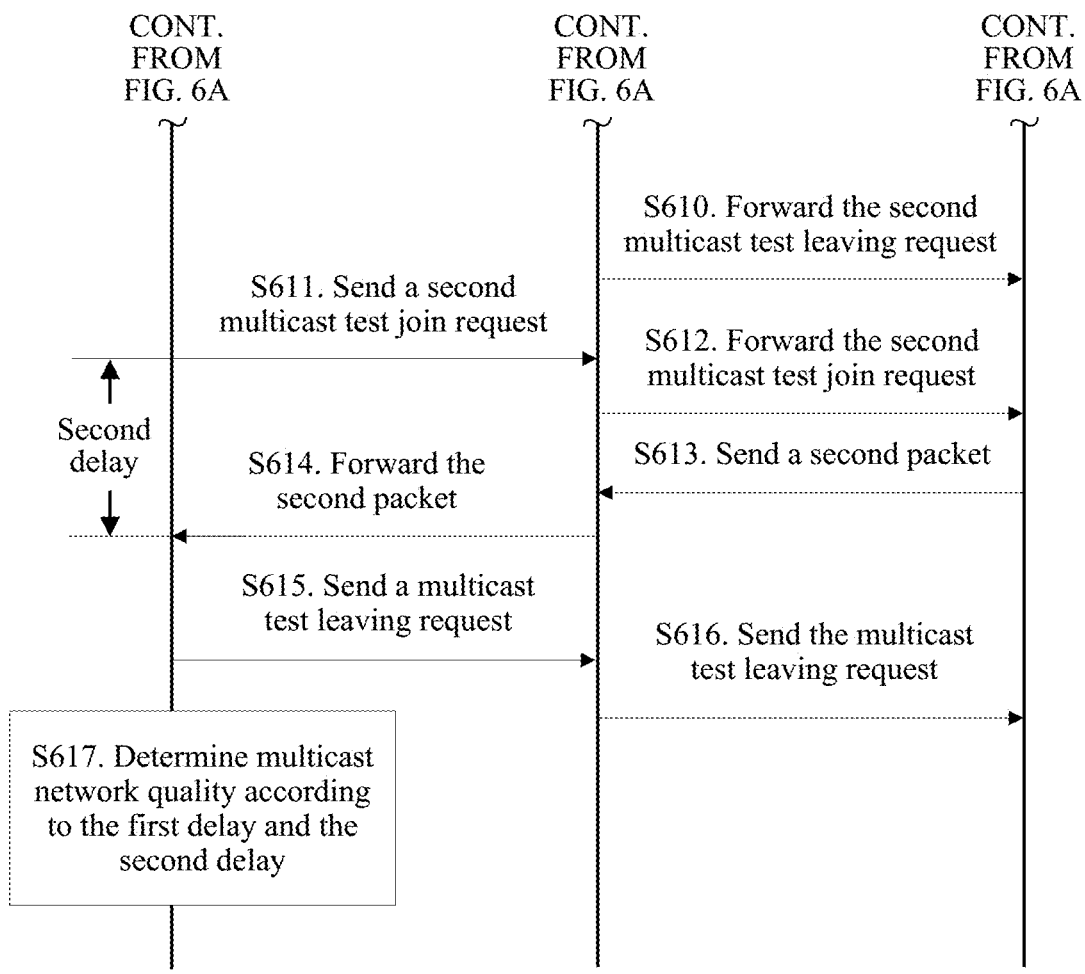

Referring to FIG. 6A and FIG. 6B, FIG. 6A and FIG. 6B are schematic flowcharts of another multicast delay diagnosis method according to an embodiment of the present invention. As shown in FIG. 6A and FIG. 6B, the method in this embodiment of the present invention includes the following steps.

S601 to S606 are the same as S401 to S406 in the foregoing embodiment. Details are not described again in this embodiment of the present invention again.

S607. The terminal device sends a second domain name resolution request to the network node.

During specific implementation, the second domain name resolution request carries a special second resource locator address URL, for example, igmpserverltest.ip. The second resource locator address URL is an address preconfigured for the terminal device and the network node. The first resource locator address URL is used to instruct the network node to return a multicast test address for joining a multicast group of a multicast server.

S608. The network node sends a second multicast test address to the terminal device.

During specific implementation, after receiving the second domain name resolution request, the network node returns multicast test addresses (an IPv4 address and an IPv6 address) used by the terminal device to join the multicast group of the multicast server. The IPv4 address and the IPv6 address are addresses preconfigured for the network node and the multicast server, and uniquely exist in a current diagnosis test process. For example, the IPv4 address is 225.0.0.1, and the IPv6 address is FF02:01::1.

S609. The terminal device sends a multicast test leaving request to the network node by using the second multicast test address. It should be noted that step S609 is an optional step herein. A reason thereof is similar to that for sending the first multicast test leaving request before S403. Details are described herein again.

During specific implementation, after the terminal device receives the IPv4 address and the IPv6 address, it indicates that the network node has both an IPv4 diagnosis test capability and an IPv6 diagnosis test capability. The terminal device may choose, according to a status of supporting two protocols (IPv4 and IPv6) by the terminal device, to send the multicast test leaving request to the network node according to the IPv4 address or the IPv6 address. If the terminal device supports IPv4, the terminal device may send the multicast test leaving request to the network node according to the IPv4 address. If the terminal device supports IPv6, the terminal device may send the multicast test leaving request to the network node according to the IPv6 address. If the terminal device supports both IPv4 and IPv6, the terminal device chooses to send the multicast test leaving request to the network node according to the IPv4 address or the IPv6 address. Therefore, both the terminal device and the network node are set to be in an initial working state, to ensure that a packet received by the terminal device is obtained according to a multicast test join request that is sent this time rather than a multicast test join request that is sent last time.

S610. The network node forwards the multicast test leaving request to a multicast server.

S611. The terminal device sends a second multicast test join request to the network node by using the second multicast test address, and records a time point for sending the second multicast test join request.

During specific implementation, the terminal device may choose, according to the status of supporting the two protocols (IPv4 and IPv6) by the terminal device, to send the second multicast test join request to the network node according to the IPv4 address or the IPv6 address.

S612. The network node forwards the second multicast test join request to the multicast server.

S613. The multicast server sends a second packet to the network node.

During specific implementation, if the terminal device sends the second multicast test join request to the network node according to the IPv4 address, the multicast server returns a second packet that carries an IPv4 address of the terminal device. If the terminal device sends the second multicast test join request to the network node according to the IPv6 address, the multicast server returns a second packet that carries an IPv6 address of the terminal device.

S614. The network node forwards the second packet to the terminal device; and the terminal device records a time point for receiving the second packet, and calculates, according to the time point for sending the second multicast test join request and the time point for receiving the second packet, a second delay caused when the terminal device joins a multicast group of the multicast server.

During specific implementation, as shown in FIG. 3(B), because there is a specific transmission distance between the terminal device and the multicast server, a delay is inevitably caused from sending the second multicast test join request to receiving the second packet. Therefore, the time point for sending the second multicast test join request is subtracted from the time point for receiving the second packet, so that the second delay caused when the terminal device joins the multicast group of the multicast server can be obtained.

S615. The terminal device sends a multicast test leaving request to the network node by using the second multicast test address.

S616. The network node forwards the multicast test leaving request to the multicast server, to clear diagnosis test states of the multicast server and the terminal device, and ensure that a next diagnosis test can be normally performed.

S617. Determine the multicast network quality according to the first delay and the second delay.

During specific implementation, the first delay may be subtracted from the second delay, to obtain a third delay caused between the network node and the multicast server; the first delay and the third delay are compared; and the multicast network quality is determined according to a result obtained after the comparison between the first delay and the third delay. Further, in a normal case, the first delay between the terminal device and the network node is less than the third delay between the multicast server and the network node. If the first delay is not less than the third delay, it is determined that quality of a multicast network between the terminal device and the network node does not meet a multicast requirement.

For example, in a normal case, a delay in a home network is less than a delay in an IPIV service public network. If the delay in the home network is greater than the delay in the IPTV service public network, it is determined that a problem occurs in multicast network quality of the home network, and therefore a high-quality multicast requirement cannot be met. In this case, prompt information may be sent, to remind a user to improve the multicast network quality of the home network. The user may adjust an access location of a network node. If a delay problem does not occur in the home network, but a delay of an entire network (the home network and the IPTV service public network) exceeds preset duration, it is determined that a problem occurs in multicast network quality of the IPTV service public network.

In this embodiment of the present invention, a special DNS request is sent to the network node, to obtain the multicast test address used to join the multicast group of the multicast server. The time point for sending the second multicast test join request and the time point for receiving the second packet returned by the multicast server are recorded, and the second delay caused when the terminal device joins the multicast group of the multicast server is calculated. Finally, it is determined, according to the first delay and the second delay, whether a problem occurs in the quality of the multicast network between the terminal device and the network node or a problem occurs in quality of a multicast network between the network node and the multicast server, so as to improve the multicast network quality.

An embodiment of the present invention further provides a multicast delay diagnosis apparatus. The apparatus includes a receiving module, a processing module, and a sending module. The methods and functions in the foregoing embodiments are performed by using the receiving module, the processing module, and the sending module. The apparatus is implemented by using hardware/software, and the hardware/software thereof includes units corresponding to the foregoing functions.

Figure 7:
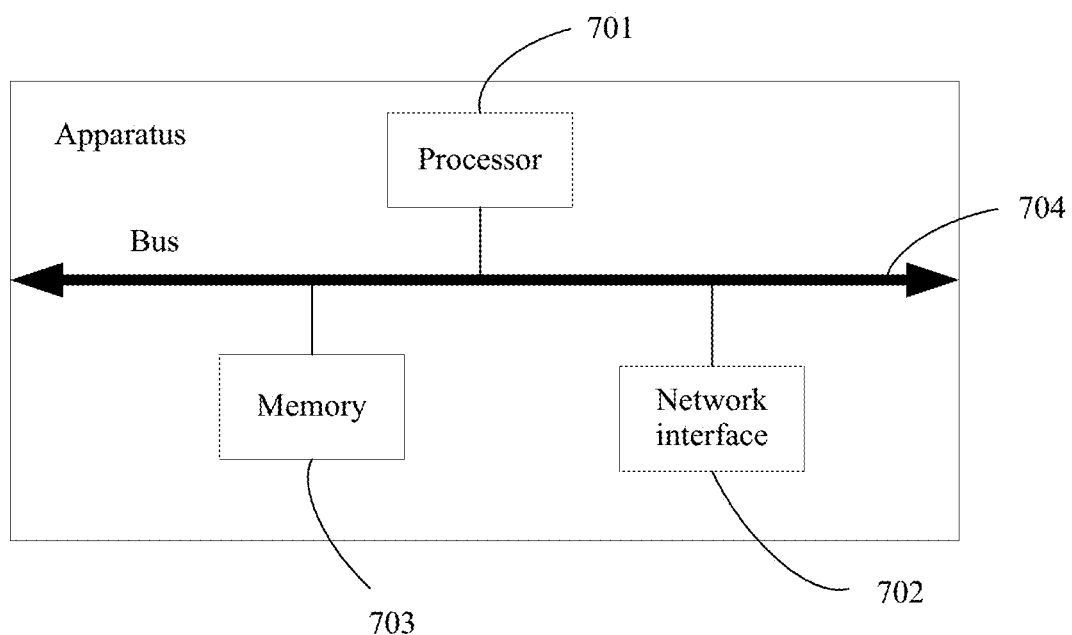
FIG. 7 is a schematic structural diagram of another multicast delay diagnosis apparatus according to an embodiment of the present invention.

Further referring to FIG. 7, FIG. 7 is a schematic structural diagram of a multicast delay diagnosis apparatus according to the present invention. As shown in the figure, the apparatus may include at least one processor 701 such as a CPU, at least one network interface 702, at least one memory 703, and at least one communications bus 704. The communications bus 704 is configured to implement connection and communication between these components. The network interface 702 of the apparatus in this embodiment of the present invention may be a wired sending port, or may be a wireless device. For example, the network interface 702 includes an antenna apparatus, configured to perform signaling or data communication with another node device. The memory 703 may be a high-speed RAM memory, or may be a non-volatile memory (non-volatile memory), such as at least one magnetic disk memory. Optionally, the memory 703 may be at least one storage apparatus that is far away from the processor 701. The memory 703 stores a group of program code, and the processor 701 executes a program that is stored in the memory 703 and that is to be executed by the foregoing terminal device.

It should be noted that, for brief description, the foregoing method embodiments are represented as a series of actions. However, persons skilled in the art should appreciate that the present invention is not limited to the described order of the actions, because according to the present invention, some steps may be performed in other orders or simultaneously. In addition, persons skilled in the art should also appreciate that all the embodiments described in this specification are example embodiments, and the related actions and modules are not necessarily mandatory to the present invention.

In the foregoing embodiments, descriptions of the embodiments have respective focuses. For a part that is not described in detail in an embodiment, refer to related descriptions in other embodiments.

Persons of ordinary skill in the art may understand that all or some of the steps of the methods in the embodiments may be implemented by a program instructing relevant hardware. The program may be stored in a computer readable storage medium. The storage medium may include a flash memory, a read-only memory (English: Read-Only Memory, ROM for short), a random access memory (English: Random Access Memory, RAM for short), a magnetic disk, an optical disc, and the like.

The content downloading method, the related device, and the system provided in the embodiments of the present invention are described in detail above. The principle and implementation of the present invention are described herein through specific examples. The description about the embodiments of the present invention is merely provided to help understand the method and core ideas of the present invention. In addition, persons of ordinary skill in the art can make variations and modifications to the present invention in terms of the specific implementations and application scopes according to the ideas of the present invention. Therefore, the content of this specification shall not be construed as a limit to the present invention.

What is claimed is:

1. A multicast delay diagnosis method, wherein the method comprises:

sending, by a terminal device, a first domain name resolution request to a network node, wherein the first domain name resolution request is used to instruct the network node to return a first multicast test address;

receiving, by the terminal device, the first multicast test address returned by the network node;

sending, by the terminal device, a first multicast test join request to the network node by using the first multicast test address, and recording a time point for sending the first multicast test join request;

receiving, by the terminal device, a first packet returned by the network node, and recording a time point for receiving the first packet;

calculating, by the terminal device according to the time point for sending the first multicast test join request and the time point for receiving the first packet, a first delay caused when the terminal device joins a multicast test group of the network node, wherein a first portion of a communication chain between a terminal device and a multicast server comprises the communication between the terminal device and the network node; and determining, by the terminal device, multicast network quality according to the first delay and according to at least a comparison of the first delay with a network delay parameter, wherein the network delay parameter is associated with a normal delay in a network caused by a second portion of the communication chain between the terminal device and the multicast server, wherein the first portion of the communication chain between the terminal device and the multicast server is different from the second portion of the communication chain between the terminal device and the multicast server.

2. The method according to claim 1, wherein the method further comprises:
sending, by the terminal device, a second domain name resolution request to the network node, wherein the second domain name resolution request is used to instruct the network node to return a second multicast test address;
receiving, by the terminal device, a second multicast test address returned by the network node;
sending, by the terminal device, a second multicast test join request to the network node by using the second multicast test address, and recording a time point for sending the second multicast test join request, so that the network node forwards the second multicast test join request to a multicast server;
receiving, by the terminal device, the second packet forwarded by the network node as a result of the second multicast test join request, and recording a time point for receiving the second packet;
calculating, by the terminal device according to the time point for sending the second multicast test join request and the time point for receiving the second packet, a second delay caused when the terminal device joins a multicast group of the multicast server; and
determining, by the terminal device, the multicast network quality according to the first delay and the second delay.

3. The method according to claim 2, wherein the determining the multicast network quality according to the first delay and the second delay comprises:
subtracting the first delay from the second delay, to obtain a third delay caused between the network node and the multicast server;
comparing the first delay and the third delay; and
determining the multicast network quality according to a result obtained after the comparison between the first delay and the third delay.

4. The method according to claim 3, wherein the step of determining the multicast network quality according to a result obtained after the comparison between the first delay and the third delay comprises:
determining that quality of a multicast network between the terminal device and the network node does not meet a multicast requirement when the first delay is not less than the third delay.

5. The method according to claim 4, further comprising :
sending a multicast test leaving request to the network node by using the first multicast test address after the receiving, by the terminal device, the first multicast test address returned by the network node.

6. The method according to claim 1, wherein the determining multicast network quality according to the first delay comprises:
determining whether the first delay is greater than preset duration; and
sending prompt information if the first delay is greater than the preset duration, wherein the prompt information is used to remind a user that quality of a multicast network between the terminal device and the network node needs to be improved.

7. The method according to claim 1, further comprising :
sending a multicast test leaving request to the network node by using the first multicast test address after the receiving, by the terminal device, the first multicast test address returned by the network node.

8. A multicast delay diagnosis apparatus, wherein the apparatus comprises a network interface, a memory, and a processor, the memory stores a group of program code, and the processor is configured to invoke the program code stored in the memory, to perform the following operations:
sending a first domain name resolution request to a network node, wherein the first domain name resolution request is used to instruct the network node to return a first multicast test address;
receiving the first multicast test address returned by the network node;
sending a first multicast test join request to the network node by using the first multicast test address, and recording a time point for sending the first multicast test join request;
receiving a first packet returned by the network node, and recording a time point for receiving the first packet;
calculating, according to the time point for sending the first multicast test join request and the time point for receiving the first packet, a first delay caused when the apparatus joins a multicast test group of the network node, wherein a first portion of a communication chain between a terminal device and a multicast server comprises the communication between the terminal device and the network node; and
determining multicast network quality according to the first delay based at least on a comparison of the first delay with a network delay parameter, associated with a normal delay in a network caused by a second portion of the communication chain between the terminal device and the multicast server, wherein the first portion of the communication chain between the terminal device and the multicast server is different from the second portion of the communication chain between the terminal device and the multicast server.

9. The apparatus according to claim 8, wherein the processor is further configured to perform the following operations:
sending a second domain name resolution request to the network node, wherein the second domain name resolution request is used to instruct the network node to return a second multicast test address;
receiving a second multicast test address returned by the network node;
sending a second multicast test join request to the network node by using the second multicast test address, and recording a time point for sending the second multicast test join request, so that the network node forwards the second multicast test join request to a multicast server;
receiving a second packet forwarded by the network node as a result of the second multicast test join request, and recording a time point for receiving the second packet;
calculating, according to the time point for sending the second multicast test join request and the time point for receiving the second packet, a second delay caused when the apparatus joins a multicast group of the multicast server; and
determining the multicast network quality according to the first delay and the second delay.

10. The apparatus according to claim 9, wherein the processor is further configured to perform the following operations:
subtracting the first delay from the second delay, to obtain a third delay caused between the network node and the multicast server;

comparing the first delay and the third delay; and determining the multicast network quality according to a result obtained after the comparison between the first delay and the third delay.

11. The apparatus according to claim 10, wherein the processor is further configured to perform the following operation:

determining that quality of a multicast network between the apparatus and the network node does not meet a multicast requirement when the first delay is not less than the third delay.

12. The apparatus according to claim 11, wherein the processor is further configured to perform the following operation:

sending a multicast test leaving request to the network node by using the first multicast test address after receiving the first multicast test address returned by the network mode.

13. The apparatus according to claim 8, wherein the processor is further configured to perform the following operations:

determining whether the first delay is greater than preset duration; and sending prompt information when the first delay is greater than the preset duration, wherein the prompt information is used to remind a user that quality of a multicast network between the apparatus and the network node needs to be improved.

14. The apparatus according to any claim 8, wherein the processor is further configured to perform the following operation:

sending a multicast test leaving request to the network node by using the first multicast test address after receiving the first multicast test address returned by the network node.

15. A non-transitory computer readable storage medium having stored thereon executable instructions that when executed by an apparatus cause the apparatus to perform operations of:

sending, by a terminal device, a first domain name resolution request to a network node, wherein the first domain name resolution request is used to instruct the network node to return a first multicast test address;

receiving, by the terminal device, the first multicast test address returned by the network node;

sending, by the terminal device, a first multicast test join request to the network node by using the first multicast test address, and recording a time point for sending the first multicast test join request;

receiving, by the terminal device, a first packet returned by the network node, and recording a time point for receiving the first packet;

calculating, by the terminal device according to the time point for sending the first multicast test join request and the time point for receiving the first packet, a first delay caused when the terminal device joins a multicast test group of the network node, wherein a first portion of a communication chain between a terminal device and a multicast server comprises the communication between the terminal device and the network node; and determining, by the terminal device, multicast network quality according to the first delay based at least on a comparison of the first delay with a network delay parameter, associated with a normal delay in a network caused by a second portion of the communication chain between the terminal device and the multicast server, wherein the first portion of the communication chain between the terminal device and the multicast server is different from the second portion of the communication chain between the terminal device and the multicast server.

16. The non-transitory computer readable storage medium according to claim 15, wherein the method further comprise instructions for:

sending, by the terminal device, a second domain name resolution request to the network node, wherein the second domain name resolution request is used to instruct the network node to return a second multicast test address;

receiving, by the terminal device, a second multicast test address returned by the network node;

sending, by the terminal device, a second multicast test join request to the network node by using the second multicast test address, and recording a time point for sending the second multicast test join request, so that the network node forwards the second multicast test join request to a multicast server;

receiving, by the terminal device, the second packet forwarded by the network node as a result of the second multicast test join request, and recording a time point for receiving the second packet;

calculating, by the terminal device according to the time point for sending the second multicast test join request and the time point for receiving the second packet, a second delay caused when the terminal device joins a multicast group of the multicast server; and determining, by the terminal device, the multicast network quality according to the first delay and the second delay.

17. The non-transitory computer readable storage medium according to claim 16, wherein the determining the multicast network quality according to the first delay and the second delay comprises:

subtracting the first delay from the second delay, to obtain a third delay caused between the network node and the multicast server;

comparing the first delay and the third delay; and determining the multicast network quality according to a result obtained after the comparison between the first delay and the third delay.

18. The non-transitory computer readable storage medium according to claim 17, wherein the step of determining the multicast network quality according to a result obtained further comprises:

determining, after the comparison between the first delay and the third delay, that quality of the multicast network between the terminal device and the network node does not meet a multicast requirement when the first delay is not less than the third delay.

19. The non-transitory computer readable storage medium according to claim 15, wherein the determining multicast network quality according to the first delay comprises:

determining whether the first delay is greater than preset duration; and sending prompt information if the first delay is greater than the preset duration, wherein the prompt information is used to remind a user that quality of a multicast network between the terminal device and the network node needs to be improved.

20. The non-transitory computer readable storage medium according to claim 15, wherein the instructions further comprise instructions for:

sending a multicast test leaving request to the network node by using the first multicast test address after the receiving, by the terminal device, the first multicast test address returned by the network node.

\* \* \* \* \*

UNITED STATES PATENT AND TRADEMARK OFFICE
CERTIFICATE OF CORRECTION

PATENT NO. : 11,032,122 B2  
APPLICATION NO. : 16/096028  
DATED : June 8, 2021  
INVENTOR(S) : Liu et al.

Page 1 of 2

It is certified that error appears in the above-identified patent and that said Letters Patent is hereby corrected as shown below:

In the Claims

Claim 2, Column 11, Line 11; delete "a second" and insert --the second--.

Claim 2, Column 11, Line 19; delete "the second" and insert --a second--.

Claim 3, Column 11, Line 31; delete "claim 2" and insert --claim 1--.

Claim 4, Column 11, Line 41; delete "claim 3" and insert --claim 2--.

Claim 4, Column 11, Line 45; delete "of a multicast" and insert --of the multicast--.

Claim 6, Column 11, Line 61; delete "of a multicast" and insert --of the multicast--.

Claim 7, Column 11, Line 64; delete "claim 1" and insert --claim 5--.

Claim 9, Column 12, Line 45; delete "a second" and insert --the second--.

Claim 10, Column 12, Line 62; delete "claim 9" and insert --claim 8--.

Claim 11, Column 13, Line 5; delete "claim 10" and insert --claim 9--.

Claim 11, Column 13, Line 8; delete "of a multicast" and insert --of the multicast--.

Claim 12, Column 13, Line 18; delete "mode" and insert --node--.

Claim 13, Column 13, Line 26; delete "of a multicast" and insert --of the multicast--.

Claim 14, Column 13, Line 29; delete "any" before "claim".

Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 11,032,122 B2

Claim 14, Column 13, Line 29; delete "claim 8" and insert --claim 12--.

Claim 16, Column 14, Line 6; delete "the method" and insert --the instructions--.

Claim 16, Column 14, Line 13; delete "a second" and insert --the second--.

Claim 16, Column 14, Line 21; delete "the second" and insert --a second--.

Claim 17, Column 14, Line 34; delete "claim 16" and insert --claim 15--.

Claim 18, Column 14, Line 45; delete "claim 17" and insert --claim 16--.

Claim 19, Column 14, Line 54; delete "claim 15" and insert --claim 18--.

Claim 19, Column 14, Line 60; delete "of a multicast" and insert --of the multicast--.